(12) United States Patent
de Ugarte et al.

(10) Patent No.: US 8,016,716 B2
(45) Date of Patent: Sep. 13, 2011

(54) PLANET CARRIER OF A PLANETARY STAGE WITH A BOGIE PLATE

(75) Inventors: Patrik Seanz de Ugarte, Leioa (ES); Javier Barañano Etxebarria, Durango (ES); Warren Gregory Smook, Huldenberg (BE); Rik Verbiest, St Amandsberg (BE)

(73) Assignees: Hansen Transmissions International N.V., Edegem (BE); Gamesa Innovation & Technology S. L., Pamplona (ES)

( * ) Notice: Subject to any disclaimer, the term of this patent is extended or adjusted under 35 U.S.C. 154(b) by 358 days.

(21) Appl. No.: 12/336,131

(22) Filed: Dec. 16, 2008

(65) Prior Publication Data
US 2009/0170655 A1 Jul. 2, 2009

(30) Foreign Application Priority Data
Dec. 19, 2007 (EP) .................................. 07076110

(51) Int. Cl.
*F16H 57/08* (2006.01)
(52) U.S. Cl. ........................................................ 475/331
(58) Field of Classification Search .................. 475/331, 475/149, 150, 338–342; 290/40 A, 40 B, 290/40 C, 55; 74/665 A, 665 B, 665 C, 665 D, 74/665 E, 665 F, 665 G, 665 GA
See application file for complete search history.

(56) References Cited

U.S. PATENT DOCUMENTS

| | | | |
|---|---|---|---|
| 3,401,580 A | 9/1968 | Sigg | |
| 4,043,216 A | 8/1977 | Steer | |
| 4,304,152 A | 12/1981 | Michling | |
| 6,179,743 B1 | 1/2001 | Morrow | |
| 6,872,049 B2 * | 3/2005 | Christensen | 415/124.1 |
| 2006/0160655 A1 * | 7/2006 | Smook et al. | 475/331 |
| 2008/0274849 A1 | 11/2008 | Smook et al. | |

FOREIGN PATENT DOCUMENTS

| | | |
|---|---|---|
| DE | 1 198 637 | 8/1965 |
| EP | 1 538 332 | 6/2005 |
| JP | 2003/222229 | 8/2003 |
| WO | 2005/050058 | 6/2005 |

OTHER PUBLICATIONS

European Search Report dated Nov. 28, 2008, from corresponding European application.

\* cited by examiner

*Primary Examiner* — David D Le
*Assistant Examiner* — David J Hlavka
(74) *Attorney, Agent, or Firm* — Young & Thompson

(57) ABSTRACT

A planet carrier of a planetary stage, the planet carrier having a bogie plate, both sides of which planet wheels can be mounted, characterized in that the planet carrier with its bogie plate is made as one monolithic piece.

20 Claims, 3 Drawing Sheets

PLANET CARRIER OF A PLANETARY STAGE WITH A BOGIE PLATE

BACKGROUND OF THE INVENTION

The present invention relates to a planet carrier of a planetary stage, whereby the planet carrier has a bogie plate, both sides of which planet wheels can be mounted.

More specifically, but not exclusively, the present invention relates to a planet carrier of the mentioned type for a wind turbine.

DESCRIPTION OF THE RELATED ART

It is known that in the technology of wind turbines there is a tendency to construct bigger and bigger wind turbines.

As a consequence, many attempts are made to reduce the weight of the wind turbines, since the less the weight, the less the forces and tensions on the structure are and therefore the operation costs are dramatically reduced.

In the latest versions of wind turbines, lot of effort is put in integrating all the parts of the wind turbine, so that a compacter design is obtained.

For example, in old designs the rotor hub of a wind turbine is completely independently supported in the housing by bearings. In that case the rotor hub is connected to the input shaft of a completely independent gear box in which the slow rotation of the rotor hub is transferred into a fast rotation at the output shaft of the gear box, which is normally connected to a power generator.

Due to the weight and dimensions of the rotor blades the rotor hub is often not kept completely in the center during rotation of the rotor blades, so that the rotor hub experiences some small deviatory movements.

If the rotor hub and the input shaft of the gear box were connected rigidly to one another, these deviatory movements would cause damage to the gear box.

That is why the connection in the older designs is usually of a relatively flexible type.

In more integrated designs that are presently known, the rotor hub is directly connected to the input shaft of the gear box and the bearings of the gear box actually bear the rotor hub or, in the opposite case, the bearings of the rotor hub support the input shaft of the gear box.

However, a disadvantage of these known designs is that the forces and accompanying deformations on the rotor hub have their direct effect on the gear box, since the rotor hub and the input shaft of the gear box are in these designs necessarily rigidly connected to one another.

A known solution to cope with these deformations is to use a bogie plate on the planet carrier.

Such a bogie plate is provided with shafts, whereby on both sides of the bogie plate planet wheels can be mounted on each shaft by means of a pair of bearings.

It is known that such a planetary gear stage with a bogie plate on the planet carrier allows for some misalignments on the planet carrier, for example due to the mentioned deformations, without significantly affecting the gear meshing.

However the construction of such a planet carrier with a bogie plate is rather a technical challenge.

In particular, the connection of the bogie plate, which holds the shafts supporting the planet wheels, to the planet carrier is critical and very difficult to realize.

Often this connection is realized by bolting the bogie plate on the planet carrier.

A disadvantage of these known planet carriers with a bolted bogie plate is that the assembly of the bogie plate on the planet carrier is complicated, time consuming and requires a lot of high strength materials, which makes the solution rather expensive.

Furthermore, the behavior of the bolted connection between the bogie plate and the planet carrier on the long term is not known.

There is always a risk that bolts get loose after a certain amount of time, so that regular maintenance or inspection of the connection is required.

Another disadvantage of a bolted connection is that the bolted parts always experience a certain, however microscopic small, mutual relative movement when the connection is loaded.

These microscopic movements can cause damage to the parts. For example in certain circumstances it can cause a typical oxidation of the parts.

SUMMARY OF THE INVENTION

The present invention aims at a planet carrier with a bogie plate, for example a planet carrier used in a wind turbine, which does not show one or more of the above and other disadvantages.

To this aim, the invention relates to a planet carrier of a planetary stage, the planet carrier having a bogie plate, both sides of which planet wheels can be mounted, whereby the planet carrier with its bogie plate is made as one monolithic piece.

An advantage of such a planet carrier according to the invention is that there is no need for any bolts, welding or whatever means to connect the bogie plate to the actual planet carrier, since planet carrier and bogie plate form one piece.

Another advantage of such a planet carrier according to the invention is that the connection between the bogie plate and the actual planet carrier is much stiffer than in the known models of planet carriers with a separate bogie plate.

Therefore, with a planet carrier according to the invention the above mentioned risks related to the use of for example a bolted connection between the bogie plate and planet carrier are avoided.

Still another advantage of a planet carrier according to the present invention is that there is no need for assembly of the bogie plate on the planet carrier, so that the production of the planetary gear stage in which it is used, is faster and the related costs are lower.

According to a preferred embodiment of a planet carrier according to the invention the planet carrier is cast.

An advantage of a planet carrier according to this embodiment is that, once the mold for the casting is made, a very high number of such planet carriers with its bogie plate made is a monolithic piece, can be produced quickly and without much further finishing in a workshop.

Another advantage of casting is that it is a relative cheap process.

BRIEF DESCRIPTION OF THE DRAWING FIGURES

With the intention of better showing the characteristics of the invention, hereafter, as an example without any restrictive character whatsoever, some preferred forms of embodiment of a planet carrier according to the present invention, are represented with reference to the accompanying drawings, wherein:

FIG. 1 schematically represents a wind turbine equipped with a gear unit comprising a planetary stage with a planet carrier in accordance with the present invention;

DESCRIPTION OF THE PREFERRED EMBODIMENTS

Figure 1:
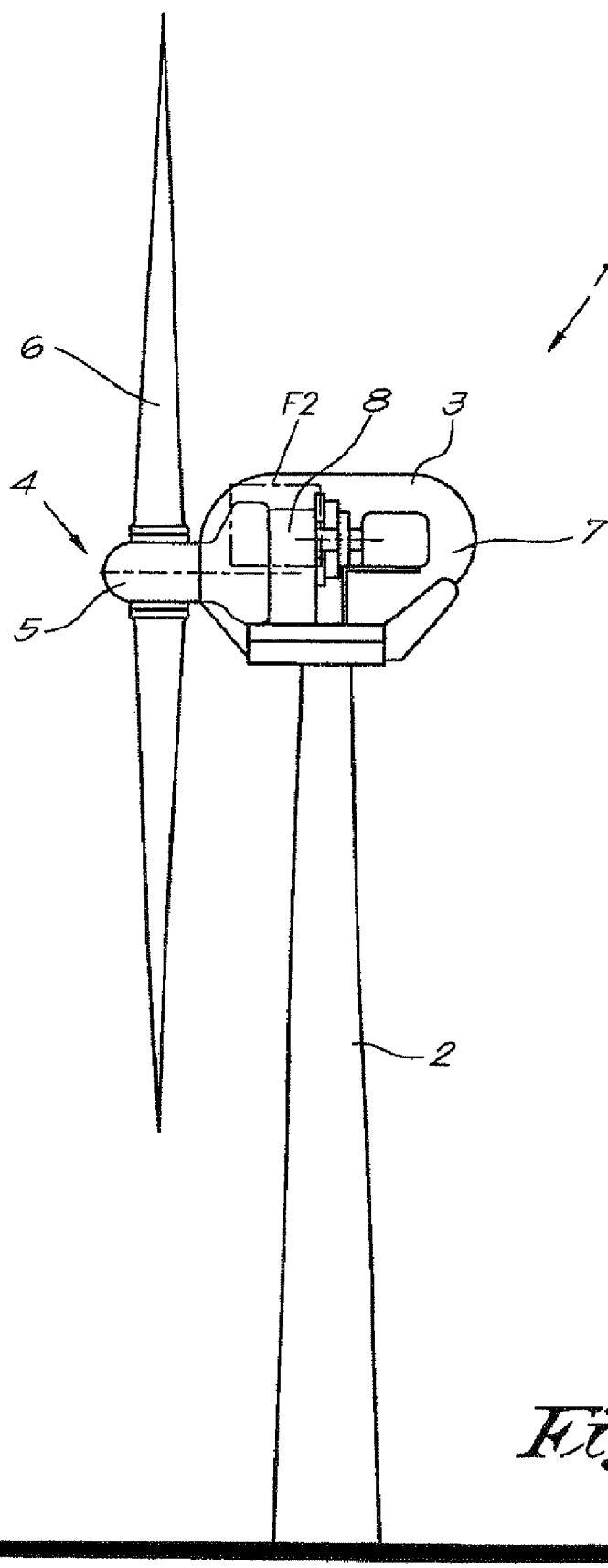

The typical wind turbine 1 represented in FIG. 1 consists of a static supporting structure 2 on which a nacelle 3 is rotatably mounted, which allows for the adjustment of the position of the wind turbine 1 to the wind direction.

In the nacelle 3, a rotor 4 with rotor hub 5 and rotor blades 6 is provided, whereby the rotor 5 is connected to a generator set 7 through a gear unit 8.

Figure 2:
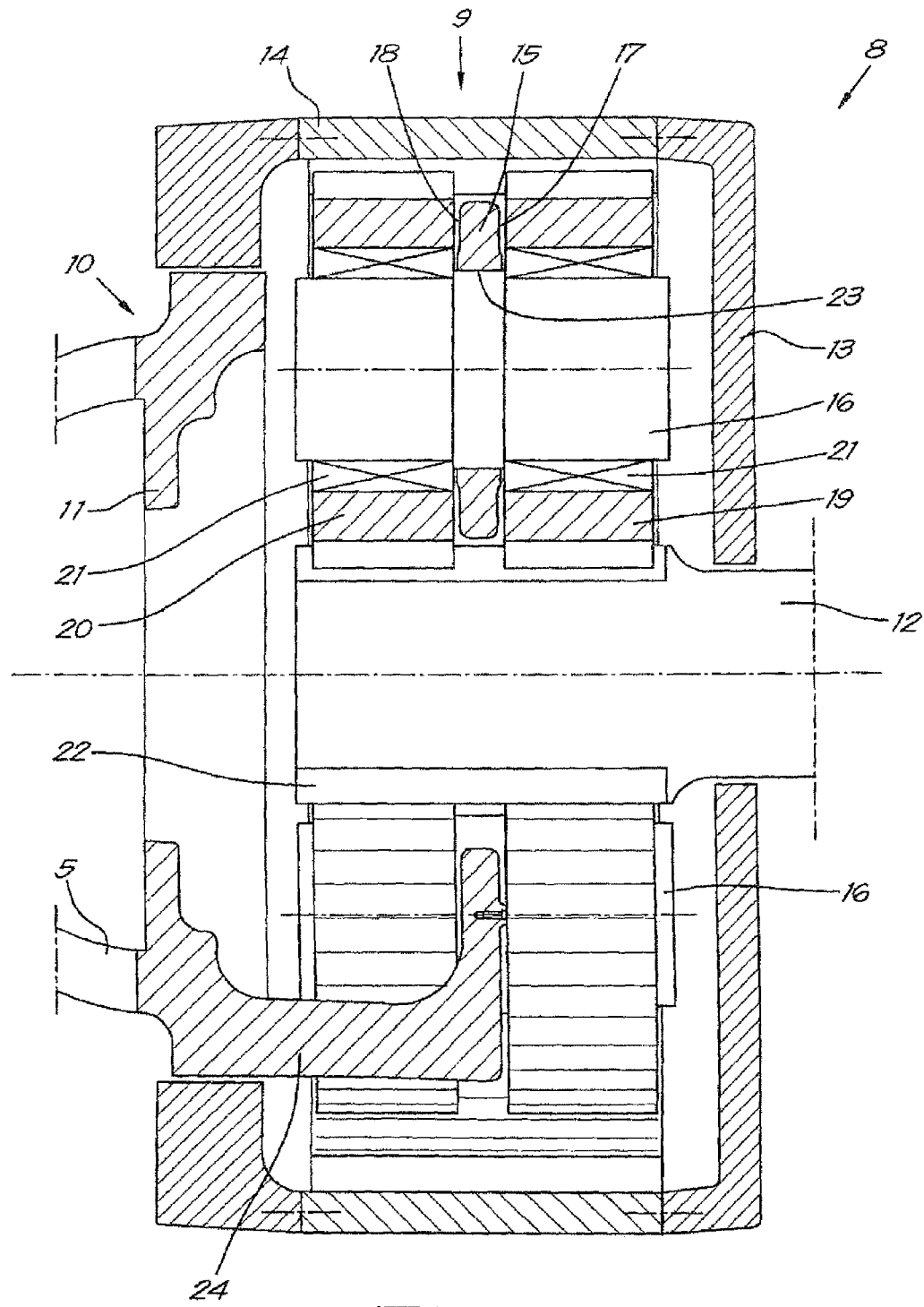
FIG. 2 represents in cross-section and on a bigger scale the part of the gear unit indicated by F2 in FIG. 1.

As is represented more in detail in FIG. 2, the gear unit 8 is in this embodiment provided with a planetary gear stage 9.

The input shaft 10 of this planetary gear stage 9, represented in this case by the planet carrier 11 of the planetary gear stage 9, is connected to the rotor hub 5, while the output shaft 12 is connected directly or indirectly through other parts of the gear unit 8 to the generator set 7 (not shown in FIG. 2, but shown in FIG. 1).

The planetary gear stage 9 is mounted in a housing structure 13, which is connected to the nacelle 3 (not shown).

To the housing structure 13 a ring wheel 14 is rigidly connected, for example by means of bolts or whatever connection means.

The planet carrier 11 is supported in a rotatable manner with regard to the housing structure 13 or the nacelle 3.

Usually this is realised by means of a main bearing or a set of bearings supporting the rotor hub 5, this hub 5 being connected to the planet carrier 11.

Furthermore, the planet carrier 11 is provided with a particular feature which is already known according to the present state of the art, i.e. a bogie plate 15. This bogie plate 15 provides in its turn support for multiple planet shafts 16.

Hereby, the planet shafts 16 extend from both sides 17 and 18 of the bogie plate 15, so that on each planet shaft 16 a pair of planet wheels 19 and 20 can be mounted, the planet wheels 20 and 21 of each pair lying on opposite sides of the bogie plate 15, respectively sides 17 and 18.

Each planet wheel 19 and 20 is supported on the planet shafts 16 by means of a planet wheel bearing 21.

Furthermore, the output shaft 12 is provided with a sun wheel 22, which keeps the output shaft 12 centralised in the planetary stage 9 by interaction with the planet wheels 19 and 20.

Usually, the output shaft 12 is connected to the input of a second planetary stage or a second parallel stage (not represented), whereby that second planetary stage is provided with bearings which support the output shaft 12 in a rotatable manner with regard to the housing 13.

It is common knowledge that in a case like the one of FIG. 2, the relatively slow rotation of the planet carrier 11 at the input shaft 10 is transformed in a relatively fast rotation of the sun wheel 22 at the output shaft 12 by the interaction between the planet wheels 21 and 22 with, on the one hand, the static ring wheel 14 and, on the other hand, with the sun wheel 22.

In the case of a wind turbine 1 this means that the slow rotation on the rotor 4 caused by the wind is transformed in a rotation at the output shaft 12, which is sufficiently fast in order to allow the power generator 7 to function properly.

It is also known that with the configuration of FIG. 2, whereby a bogie plate 15 is connected to the planet carrier 11 and whereby on both sides 17 and 18 of the bogie plate 15 planet wheels 18 and 19 are provided, a certain amount of deformation in the gear unit 8 caused by the weight of the rotor 4 and/or dynamic loads on the rotor 4 can be absorbed.

However the connection between the actual planet carrier and the bogie plate 15 is, as mentioned in the introduction, in the known planet carriers with bogie plate often realised by bolting the parts together, so that the assembly is time consuming and expensive.

Furthermore, it is not known how this bolted connection will behave over a long period, whereby there is always a risk some of the bolts will loosen.

Another risk is that the microscopic relative movement that always exists between bolted parts under load will cause oxidation of the parts.

In accordance with the present invention however, the planet carrier 11 with its bogie plate 15 is made as one monolithic piece.

It is clear that with such a planet carrier 11 according to the invention with integrated bogie plate 15, a much more rigid structure is obtained than with the known types of planet carriers with bogie plates, whereby the above mentioned risks of loosening of the connection between bogie plate and planet carrier as well as oxidation of these parts caused by mutual microscopic relative movement are avoided.

Furthermore, it is clear that in the case of a planet carrier 11 and bogie plate 15 in accordance with the invention there is no need to assemble anymore, so that time and money is saved.

Figure 3:
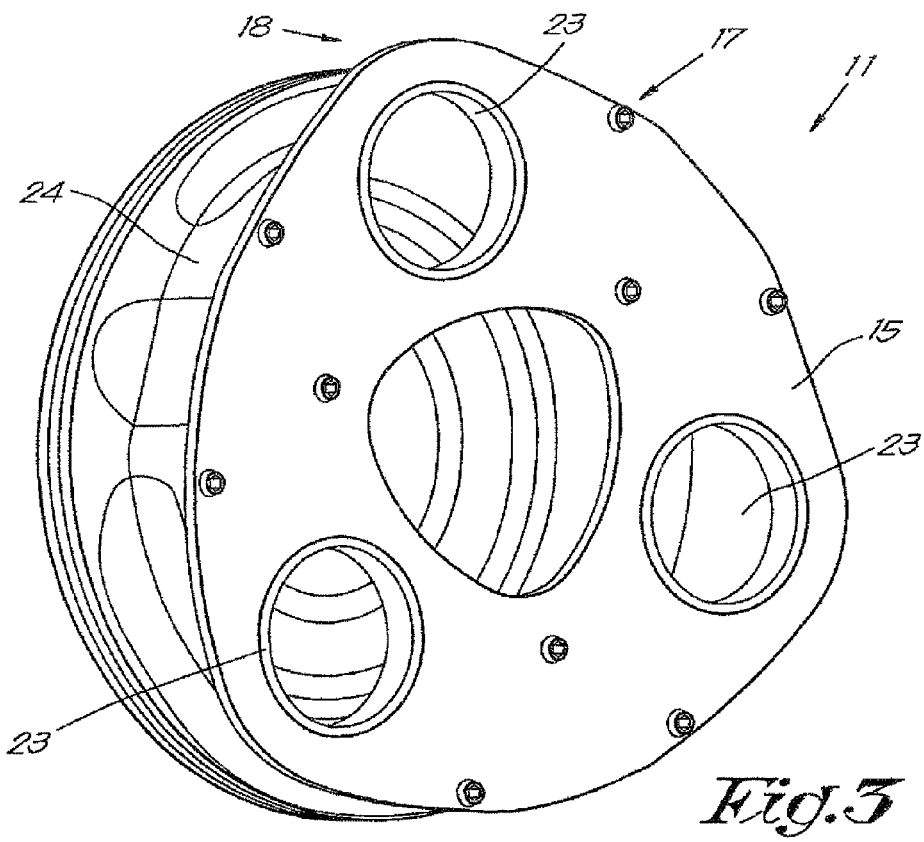
FIG. 3 represents a perspective view of the planet carrier in accordance with the present invention and indicated by F3 in FIG. 2; and, FIG. 4 is a typical graph representing the evolution of the temperature in function of the time during a step of the processing of a planet carrier according to the invention.

FIG. 3 represents in perspective view the planet carrier 11 of FIG. 2, wherein it can be clearly seen that the planet carrier 11 and bogie plate 15 are formed as one monolithic piece in accordance with the invention.

In the holes 23 in the bogie plate 15 planet shafts 16 can be mounted.

The bogie plate 15 and the planet carrier 11 are connected by means of beams 24 which are an integral part of the monolithic piece.

According to a preferred embodiment of the present invention the planet carrier 11 with its bogie plate 15 is cast as one monolithic piece.

This embodiment of the invention has the advantage that the production is very much simplified. Indeed, once the mold has been fabricated, a lot of pieces can be made very quick, easily and less expensive.

According to a still more preferred embodiment of a planet carrier 11 in accordance with the present invention, the planet carrier 11 and its bogie plate 15 are made of a ductile cast iron, also called nodular cast iron.

Classical cast iron is rather brittle. This is caused by the high content of carbon in it. When the cast solidifies, some of this carbon precipitates as graphite flakes, the flakes enhancing the forming of cracks.

In ductile cast iron so called "nodulizers", like magnesium or cerium, are added. These "nodulizers" cause the carbon to precipitate as graphite nodules rather than as flakes, so that the forming of cracks is discouraged and the metal is more ductile.

The advantage of the use of ductile cast iron is that a stronger monolithic piece is obtained, having a good toughness and wear resistance, as well as a rather limited weight compared to its strength.

In order to enhance the properties of the planet carrier 11 and integrated bogie plate 15 even more, it is additionally preferred, according to the invention, to use an austempered ductile iron, also known as ADI.

An austempered ductile iron is obtained through casting as a normal ductile cast iron, whereby it is subsequently subjected to an austempering process, which ameliorates considerably its mechanical properties, like tensile strength, yield strength, fatigue strength, impact resistance, hardness, etc. . . .

Figure 4:
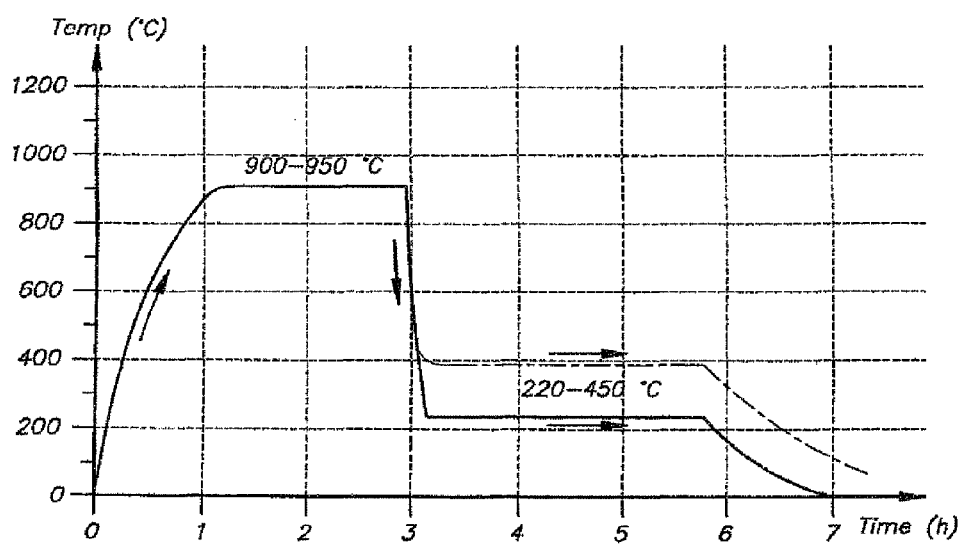

FIG. 4 shows a typical graph of what happens during the austempering process after the casting.

Hereby the cast metal is first brought quickly to a temperature of about 900 to 950° C. At this temperature a stable solid solution of iron and carbon is obtained, the so-called γ-phase iron or austenite.

After a few hours the metal is then suddenly cooled (quenched) to a temperature of between 220 and 450° C., where an isothermal process is started during which residual stresses within the material are relieved and some recrystallisaton is allowed, so that the ductility increases with a minimal loss in strength.

According to the most preferred embodiment of a planet carrier in accordance with the present invention, the planet carrier 11 is made of an austempered ductile iron, with a tensile strength of minimum 1000 MPa, also known according to the Ferrocast ADI norm as F-ADI 1000 or, according to the European norm DIN EN 15 64, as EN-GJS-1000-5.

It is clear that such a planet carrier 11 in accordance with the invention, whereby the planet carrier 11 and the bogie plate 15 are cast as one monolithic piece and subsequently are passed through an austempering process in order to get an austempered ductile iron with a tensile strength of 1000 MPa, has a very rigid connection between the planet carrier 11 and the bogie plate, the connection being still ductile enough in order to prevent it from failure under a considerable impact.

The present invention is in no way limited to the embodiments described above and represented in the drawings, but such a planet carrier 11 may be realised in different shapes, materials and dimensions, without departure from the scope of the invention.

The invention claimed is:

1. A planet carrier (11) intended for use in a planetary stage (9), the planet carrier (11) comprising a bogie plate (15), the bogie plate (15) intended for providing support to planet shafts (16) which extend from both sides (17,18) of the bogie plate (15), and the boogie plate (15) being such that at both the sides (17, 18) of the bogie plate on the planet shafts planet wheels (19,20) can be mounted, supported by means of planet wheel bearing (21), and the planet wheels (19, 20) intended for interaction with a sun wheel (22) and a ring wheel (14) of the planetary stage (9), wherein the planet carrier (11) together with the bogie plate (15) are made as one monolithic piece.

2. A planet carrier (11) according to claim 1, wherein the one monolithic piece is a cast piece.

3. A planet carrier (11) according to claim 2, wherein the one monolithic piece (11) is made of a ductile cast iron, also called nodular cast iron.

4. A planet carrier (11) according to claim 3, wherein the one monolithic piece is made of an austempered ductile iron.

5. A planet carrier (11) according to claim 4, wherein the one monolithic piece is made of an austempered ductile iron, with a tensile strength of minimum 1000 MPa.

6. A planet carrier (11) according to claim 1, wherein the planet carrier (11) is applied in a gear unit (8) of a wind turbine (1).

7. A planet carrier (11) according to claim 2, wherein the planet carrier (11) is applied in a gear unit (8) of a wind turbine (1).

8. A planet carrier (11) according to claim 3, wherein the planet carrier (11) is applied in a gear unit (8) of a wind turbine (1).

9. A planet carrier (11) according to claim 4, wherein the planet carrier (11) is applied in a gear unit (8) of a wind turbine (1).

10. A planet carrier (11) according to claim 5, wherein the planet carrier (11) is applied in a gear unit (8) of a wind turbine (1).

11. A wind turbine gear unit, comprising:
a housing structure (13); and
a planetary gear stage (9) mounted in the housing structure (13), the planetary gear stage (9) comprised of
i) an output shaft (12) configured for connecting to a wind turbine generator set (7),
ii) a ring wheel (14) mounted to the housing structure (13),
iii) a monolithic planet carrier-bogie plate (11, 15) configured for connecting to a wind turbine rotor hub (5),
the monolithic planet carrier-bogie plate comprising a bogie plate (15) with two opposite sides (17, 18), and beams (24) connecting the planet carrier (11) to the bogie plate (15),
the bogie plate (15), the beams (24), and the planet carrier (11) being one monolithic piece,
the bogie plate (15) comprising plural planet shafts supporting mounts (23),
iv) plural planet shafts (16), each planet shaft (16) mounted by one of the supporting mounts (23) and extending from both of the two opposite sides (17, 18) of the bogie plate (15),
v) planet wheels (19, 20) mounted on the planet shafts (16) with the planet wheels (19, 20) lying on the opposite sides (17, 18) of the bogie plate (15), the planet wheels (19, 20) configured for interaction with ring wheel (14),
vi) a planet wheel bearing (21) supporting each planet wheel (19, 20), and
vii) a sun wheel (22) configured for interaction with the planet wheels (19, 20).

12. The unit of claim 11, wherein the one monolithic piece is a cast piece.

13. The unit of claim 11, wherein the one monolithic piece is a ductile cast iron piece.

14. The unit of claim 11, wherein the one monolithic piece is an austempered ductile iron piece.

15. The unit of claim 11, wherein the one monolithic piece is an austempered ductile iron piece, with a tensile strength of minimum 1000 MPa.

16. A monolithic planet carrier-bogie board (11, 15) for a wind turbine, comprising:
a planet carrier (11);
a bogie plate (15) with two opposite sides (17, 18); and
beams (24) connecting the planet carrier (11) to the bogie plate (15),
the bogie plate (15), the beams (24), and the planet carrier (11) being one monolithic piece,
the bogie plate (15) comprising plural supporting mounts (23), each supporting mount (23) configured for mounting a planet shaft (16), each planet shaft (16) extending from both of the two opposite sides (17, 18) of the bogie plate (15), planet wheels (19, 20) mounted on the planet shafts (16) with the planet wheels (19, 20) lying on the opposite sides (17, 18) of the bogie plate (15), a planet wheel bearing (21) supporting each planet wheel (19, 20), the planet wheels (19, 20) configured for interaction with a ring wheel (14) and for interaction with a sun wheel (22).

17. The wind turbine planet carrier (11) of claim 16, wherein the one monolithic piece is a cast piece.

18. The wind turbine planet carrier (11) of claim 16, wherein the one monolithic piece is a ductile cast iron piece.

19. The wind turbine planet carrier (11) of claim 16, wherein the one monolithic piece is an austempered ductile iron piece.

20. The wind turbine planet carrier (11) of claim 16, wherein the one monolithic piece is an austempered ductile iron piece, with a tensile strength of minimum 1000 MPa.

* * * * *